July 1, 1969 R. N. LEVAKE 3,453,006
CONDUIT COUPLING
Filed March 28, 1966

RICHARD N. LEVAKE
INVENTOR

Huebner & Worrel
ATTORNEYS

United States Patent Office 3,453,006
Patented July 1, 1969

3,453,006
CONDUIT COUPLING
Richard Neilson Levake, Phoenix, Ariz., assignor, by mesne assignments, to C & L Industries, Inc., Phoenix, Ariz., a corporation of Arizona
Filed Mar. 28, 1966, Ser. No. 537,945
Int. Cl. F16l *19/00, 21/00, 23/00*
U.S. Cl. 285—104          5 Claims

ABSTRACT OF THE DISCLOSURE

A tubular coupling particularly suited for use in joining thin-walled, plastic conduits at their terminal portions in a fluid-tight interconnection, characterized by a sleeve-like deformable coupling structure including a plurality of inwardly directed annular ridge-like protrusions for receiving plastic conduits and the like and forming a fluid-tight seal therewith and a reinforcing member including a meshed wall having inwardly directed prongs extending to the innermost surfaces of the annular protrusions for engaging the outermost surfaces of the received conduit.

Background of the invention

The present invention relates to a conduit coupling and more particularly to such a coupling for holding tubular members in fluid-tight interconnection.

The methods previously employed for joining metal and plastic conduits have usually involved welding or theading the conduit ends together, or employing screw-threaded couplings to connect the conduits in desired association.

Joining plastic conduits by welding has many disadvantages, the principal one being that it is difficult to form a deep and a strong weld. Furthermore, equipment employed for welding metal cannot be used for welding plastic conduits because the heat generated by the welding operation decomposes the plastic. To date, no suitable alternative equipment has been developed for welding plastic conduits.

Joining plastic conduits by threading their ends has not proven satisfactory because commercial plastics employed for conduit materials do not provide strong threads. Additionally, these conduits cannot be threaded to close tolerances so that when employed in high pressure operations, leaks occur between the threads.

In the past, couplings also have been employed for connecting both metal and plastic conduits. Some types of couplings are produced by molding a plastic tube about a metal reinforcing tube and providing the inner surface of the plastic tube with spiral ridges for engagement with corresponding exterior corrugations of the pipe. However, the coarse pitch of the ridges and corrugations results in leaks developing when fluids under pressure are conveyed through the conduits. Furthermore, the burst strength of the coupling is limited principally by the strength of the spiral ridges whereas ideally the burst strength should be controlled by the strength of the reinforcing tube.

Welding metal conduits is not only cumbersome, but involves skilled labor which is expensive; the welding operation itself is also time consuming and on occasion welder's sparks have caused serious fires. Threaded connections have also been employed to connect metal conduits, but although the threads are much stronger than those of plastic pipes, they are time consuming and expensive to form.

Summary of the invention

This invention overcomes many of the aforementioned disadvantages and difficulties through the use of a simplified, economical, reinforced coupling member which includes flexible annular protrusions for sealingly engaging fluid conduits introduced at either end thereof without requiring the use of welds, threads and the like.

It is, therefore, an object of the present invention to provide a conduit coupling particularly suitable for holding metal and plastic conduits in fluid-tight endward interconnection.

Another object is to provide a conduit coupling capable of withstanding high fluid pressures.

Another object is to provide a plastic coupling for conduits which eliminates the necessity for the conduits to be threaded or welded.

Another object is to provide a coupling which may be used for both metal and plastic conduits.

Another object is to provide a conduit coupling of economical construction.

Another object is to provide such a coupling which is self sealing.

A further object is to provide a conduit coupling which is simple and easy to install.

Still further objects are to provide a conduit coupling which is durable, has the holding properties attainable by metal, but avoids the rust and corrosion problems to which metal is normally susceptible.

Additional objects and advantages will become apparent in the subsequent description in the specification.

Description of the invention

Figure 1:
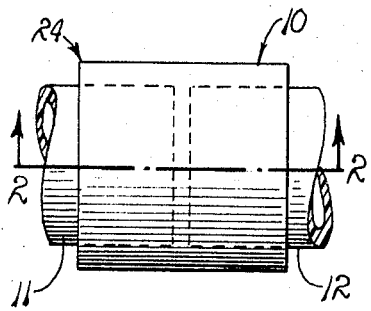
FIG. 1 is a side elevation of a conduit coupling embodying the principles of the invention holding two plastic conduits in fluid-tight endward interconnection.
Figure 2:
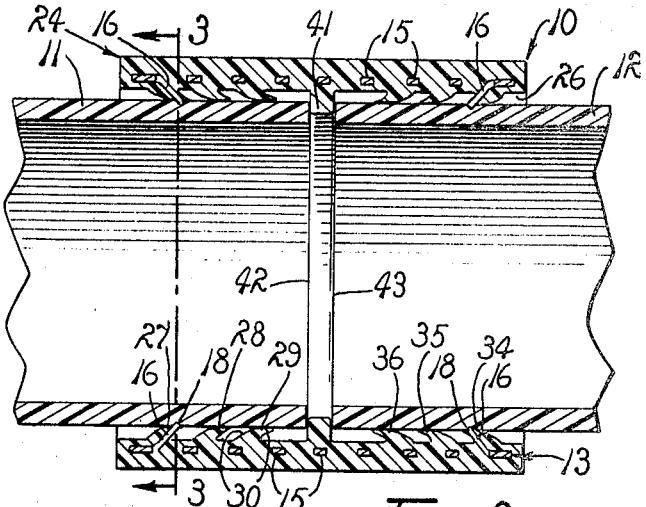
FIG. 2 is a longitudinal section taken on line 2—2 of FIG. 1.
Figure 3:
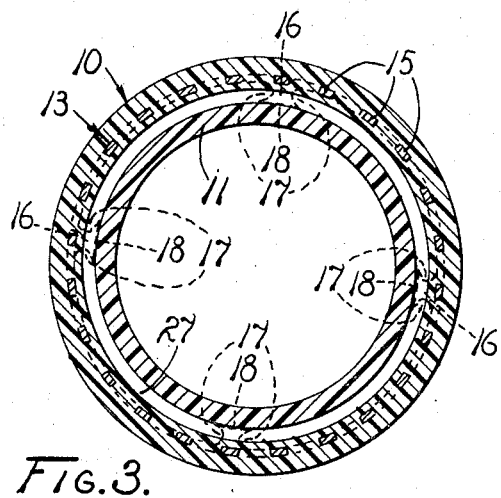
FIG. 3 is a transverse section of the conduit coupling and one of the conduits taken at a position represented by line 3—3 of FIG. 2.
Figure 4:
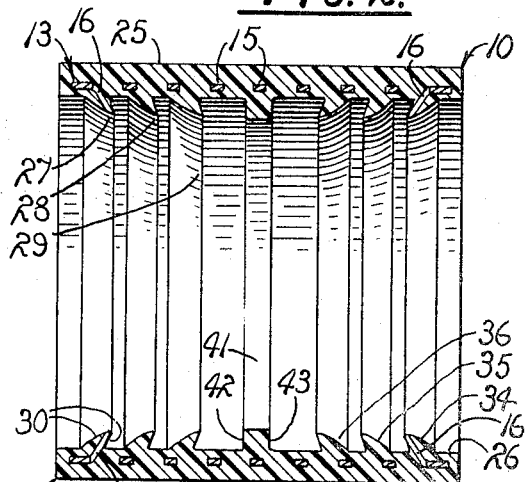
FIG. 4 is an enlarged axial section of the coupling.
Figure 5:
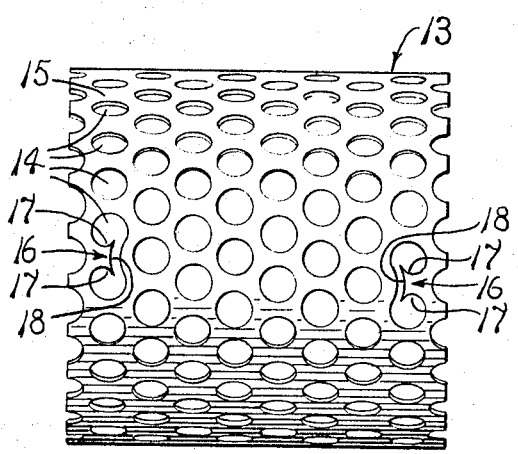
FIG. 5 is a side elevation of a reinforcing tube perforated to form a mesh wall and having holding prongs, as employed in the coupling of the present invention.
Figure 6:
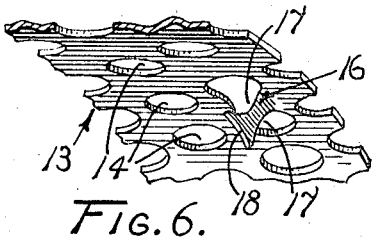
FIG. 6 is an enlarged fragmentary perspective of the inside of the reinforcing tube of FIG. 5.

Turning to FIG. 1, a conduit coupling 10 is illustrated holding conduits 11 and 12 in leak-proof endward interconnection. The conduits may be of any suitable material such as polyvinylchloride, polyethylene, copper, steel, aluminum, and the like, and may have circumscribing corrugations if desired. Such corrugations, not shown, are sometimes desirable at high pressures. When employed at low pressures, the corrugations are not necessary.

The coupling 10 includes a concentrically disposed reinforcing metal tube 13, of stainless steel or other suitable non-elastic material, provided with a plurality of circular perforations 14 that define a mesh wall 15. At periodic intervals along and circumferentially of the tube, the mesh wall is partly broken away and prongs 16 formed which are extended inwardly of the tube and towards the opposite or more remote end thereof. Each prong has opposite edges 17 and an end 18. The end is preferably sharpened as it is struck from the tube and concave so as to conform to the exteriors of the conduits 11 and 12.

A uniform, deformable polyurethane tube 24 embeds the metal tube 13 and fills the perforations 14, is bonded to the metal, and inwardly and outwardly overlays the metal in sheathing relation thereto. The polyurethane containing a suitable filler, if desired, is applied to the tube 13 by standard molding techniques to form a smooth exterior surface 25 and an inner ridged surface 26. The inner surface at one end of the polyurethane tube is provided with a set of substantially parallel circumscribing ridges 27, 28, and 29, each ridge having outwardly converging walls 30. A similar set of ridges 34, 35, and 36 are provided at the other end of the tube. The walls of both sets of ridges are inclined towards the center of the polyurethane tube to facilitate insertion of the conduits 11 and 12. Thus, in section longitudinally of the coupling 10, the ridges are of saw-tooth configuration inclined or pitched toward the middle of the coupling. If corrugations are provided on the conduits, the corrugations and ridges are sized and spaced for engagement with each other. It is to be noted that the prongs 16 are spaced so as to be disposed in the ridges.

An annular flange or gasket formation 41 is provided intermediate the ends of the coupling 10 and between the sets of ridges 27 through 29 and 34 through 36. The flange is fitted to the ends of the conduits and provides axially disposed end walls 42 and 43. Said walls abut the ends of the conduits 11 and 12, insure a central positioning of the conduits in the coupling and have an advantageous sealing effect.

*Operation*

The operation of the described embodiment of FIGS. 1 through 6 inclusive, is believed to be readily apparent and is briefly summarized at this point. To connect the conduits 11 and 12, the coupling 10 is forced over the end of one conduit until the flange 41 abuts against the end thereof. The other conduit is then forced into the opposite end of the coupling until it abuts the flange which is then compressed between the conduits. Because of the inwardly pitched attitude of the ridges 27 through 29 and 34 through 36 and the inward direction of the prongs 16, the coupling and conduits are so easily associated in the manner described that it can be manually performed even with conduits of large size. The ridges, because of their flexibility, are pressed into contact with the conduits and provide fluid-tight association with them. Because of the saw-tooth inward direction of the ridges and the spaces therebetween which act as pressure chambers, the greater the pressures to be resisted, the greater the outer thrust on the ridges into increased sealing engagement. The ends 18 of the prongs 16 project through the ridges and gouge into the conduits thereby preventing fluid pressure from forcing the conduits out of the coupling. The inward disposition of the prongs cause them to function in a manner somewhat similar to ratchets. They flex outwardly easily slidably to receive the conduits when the conduits are thrust inwardly thereover. However, the slightest outward movement of a conduit, causes the prongs in engagement therewith to swing inwardly into progressively increased, gouging conduit engagement precluding endward disassociation of the conduit from the coupling. When employed in low pressure operations such as in the sewage lines or low pressure water lines, these prongs can be eliminated.

In contrast to prior art couplings of plastic or other resiliently compressible material in which the burst strength is determined solely by the strength of the plastic or other compressible material, the burst strength of the conduit coupling of the present invention is determined by the amount of fluid pressure required to extrude the solidified polyurethane through the circular perforations 14 of the tubing 13. By decreasing the size of the perforations, a greater pressure is necessary to extrude the polyurethane and the burst strength of the coupling accordingly increased.

Other deformable plastic or rubber compounds may be employed in the coupling in place of polyurethane in adapting to particular environmental, performance or cost requirements. Polyurethane is excellently suited to the purpose. In any event, the utilization of the tube 13 of substantially non-elastic material under the pressures to be resisted is an essential and it is likewise required that a layer of compressible sealing material be confined internally thereof.

The present invention provides a conduit coupling having a burst strength determined primarily by the strength of the metallic reinforcing tube rather than being determined by the ridges of the plastic tube or the strength of the plastic. This, of course, is a major advantage. In addition, because the coupling may be installed quickly, labor and installation charges are significantly lower and since the installation is manual, no special tools are necessary. Most significantly, the coupling provides a leak-proof connection even under high fluid pressures. The coupling may be manufactured using presently available equipment and techniques and requires only simple and inexpensive components.

Although the invention has been herein shown and described in what is conceived to be the most practical and preferred embodiment, it is recognized that departures may be made therefrom within the scope of the invention.

Having described my invention, what I claim as new and desire to secure by Letters Patent is:

1. A conduit coupling comprising a substantially cylindrical member of resiliently compressible material having inner and outer surfaces; a substantially cylindrical non-elastic metallic tube imbedded substantially concentrically within the cylindrical member intermediate the inner and outer surfaces thereof, the tube being perforated and the compressible material of the cylindrical member extending through said perforations, the inner surface of the cylindrical member adjacent to an end thereof providing a plurality of substantially parallel ridges defined by walls which converge inwardly of said member and away from said adjacent end, the ridges being adapted slidably to receive a tubular member, with said member to define closed annular pressure chambers between the ridges circumscribing the tubular member, the inward convergence of the walls serving to cause the ridges on opposite sides of the pressure chambers to flex away from said adjacent end of the member to facilitate reception of such a tubular member and serving to cause the ridges on opposite sides of the pressure chambers to flex inwardly and constrict about such tubular member upon movement of such tubular member outwardly of said adjacent end; and rigid metallic means integral with the tube extended inwardly thereof within the ridges and away from said adjacent end, said means having inner edges engageable with such tubular member inserted therein for gripping the same.

2. The coupling of claim 1 in which the compressible material is adapted to flex through the perforations of the tube.

3. The coupling of claim 1 in which the compressible material is bonded to the tube.

4. A conduit coupling comprising:
   (a) a deformable substantially cylindrical member;
   (b) a relatively rigid metallic tubular reinforcing member having a meshed cylindrical wall imbedded in the deformable member and disposed in substantially concentric alignment therewith;
   (c) means defining within the deformable member a plurality of inwardly disposed, circumscribing, substantially parallel, deformable, angular ridges near at least one end of the tubular member so disposed as to be inclined toward the opposite end of the member and adapted to be deformed to accommodate an insertion of a conduit from the adjacent end of the tubular member;
   (d) an inwardly extended circumscribing annular gasket integral with the tubular member disposed within the coupling between the ends thereof; and
   (e) a plurality of circumferentially spaced, relatively rigid metallic prongs integrally connected with and extending inwardly from the reinforcing member and terminating at the innermost surfaces of the ridges for engaging the outermost surfaces of conduits as they are caused to be inserted into the coupling, whereby the prongs are caused to support the conduits against withdrawal.

5. The coupling of claim 4, wherein each prong comprises a member having a curved terminal edge substantially conforming to the curvature of a circumference of a conduit received within the coupling and so formed as to penetrate the outermost surface of a received and engaged conduit.

References Cited

UNITED STATES PATENTS

| | | | |
|---|---|---|---|
| 400,600 | 4/1889 | Rockwell | 285—383 |
| 1,817,776 | 8/1931 | Sipe | 285—340 |
| 1,926,197 | 8/1933 | Durr | 285—345 X |
| 2,805,591 | 9/1957 | Widmer | 285—369 X |
| 2,810,424 | 10/1957 | Swartswelter | 264—173 X |
| 2,976,093 | 3/1961 | Reiling | 264—273 X |

FOREIGN PATENTS

| | | |
|---|---|---|
| 594,113 | 5/1959 | Italy. |
| 618,723 | 3/1961 | Italy. |

THOMAS F. CALLAGHAN, *Primary Examiner.*

U.S. Cl. X.R.

285—110, 235, 423